United States Patent
Vitanza

(10) Patent No.: US 8,857,686 B1
(45) Date of Patent: Oct. 14, 2014

(54) REAR MOUNTED BIKE RACK

(71) Applicant: John A. Vitanza, Winnetka, CA (US)

(72) Inventor: John A. Vitanza, Winnetka, CA (US)

(*) Notice: Subject to any disclaimer, the term of this patent is extended or adjusted under 35 U.S.C. 154(b) by 0 days.

(21) Appl. No.: 14/038,512

(22) Filed: Sep. 26, 2013

Related U.S. Application Data

(63) Continuation-in-part of application No. 13/907,678, filed on May 31, 2013, now abandoned, which is a continuation of application No. 12/592,956, filed on Dec. 7, 2009, now Pat. No. 8,453,895.

(51) Int. Cl.
*B62J 7/04* (2006.01)

(52) U.S. Cl.
CPC ............... *B62J 7/04* (2013.01); *Y10S 224/925* (2013.01)
USPC ............. 224/454; 224/422; 224/431; 224/925

(58) Field of Classification Search
USPC ......... 224/412, 422, 423, 428, 429, 431, 440, 224/451, 452, 453, 454, 925, 42.32, 430, 224/42.11, 432, 498, 499; 248/95; 220/4.28, 4.29; 16/366
See application file for complete search history.

(56) References Cited

U.S. PATENT DOCUMENTS

| | | | | |
|---|---|---|---|---|
| 582,229 A * | 5/1897 | Reynolds | ........................ | 224/432 |
| 605,188 A * | 6/1898 | Rondell | ........................ | 224/444 |
| 2,675,151 A * | 4/1954 | Herbert | ........................ | 224/432 |
| 4,364,497 A * | 12/1982 | Zimmerli | ........................ | 224/454 |
| 5,205,142 A * | 4/1993 | Kruger et al. | ..................... | 70/16 |
| 5,845,951 A * | 12/1998 | Webb | ........................... | 294/159 |
| 6,367,746 B1 * | 4/2002 | Webb et al. | ..................... | 248/95 |
| 6,843,396 B2 * | 1/2005 | Champagne | .................. | 224/422 |
| 6,991,204 B2 * | 1/2006 | Ay | ................................ | 248/308 |
| 2006/0138185 A1 * | 6/2006 | Lien et al. | ..................... | 224/427 |
| 2010/0327034 A1 * | 12/2010 | Hajiani | ......................... | 224/441 |
| 2011/0272371 A1 * | 11/2011 | Pettifer | ...................... | 211/85.15 |

* cited by examiner

*Primary Examiner* — Justin Larson
(74) *Attorney, Agent, or Firm* — Colin P. Abrahams

(57) ABSTRACT

A rack for mounting on a bicycle, comprises a platform, having a top surface, and structure for removably mounting the platform with respect to the frame of a bicycle. A post is mounted on the platform so that it can extend above said top surface of said platform. Left and right skirts are also mounted on the platform, and are deployed position to inhibit grocery bags engaged on the post from engaging the rear wheel of the bicycle. The skirts are mounted on the platform so that they can be carried on the platform in a stored position. A storage back is positioned over the platform and skirts, the storage bag having inside facing pockets for accommodating at least a part of the skirts.

19 Claims, 18 Drawing Sheets

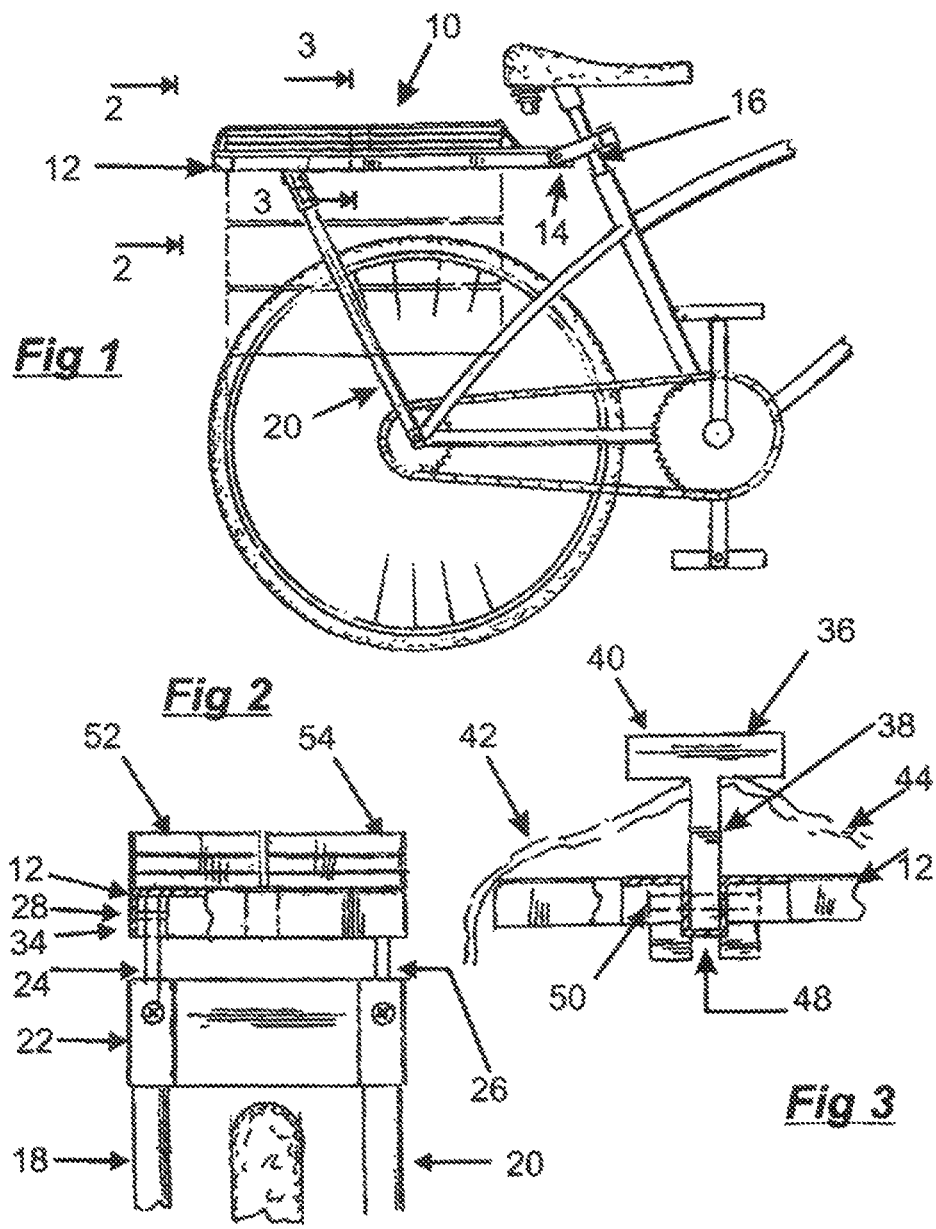

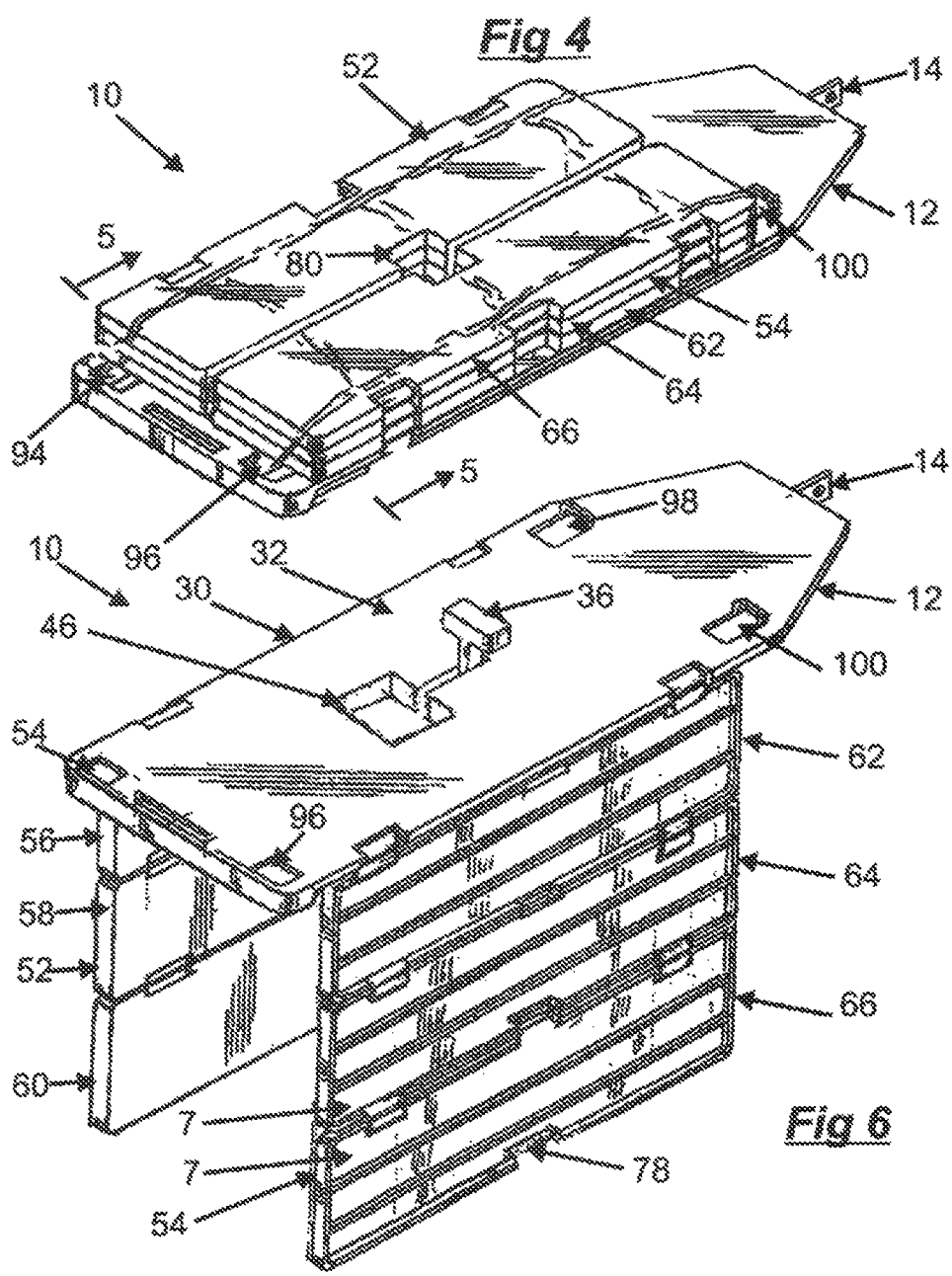

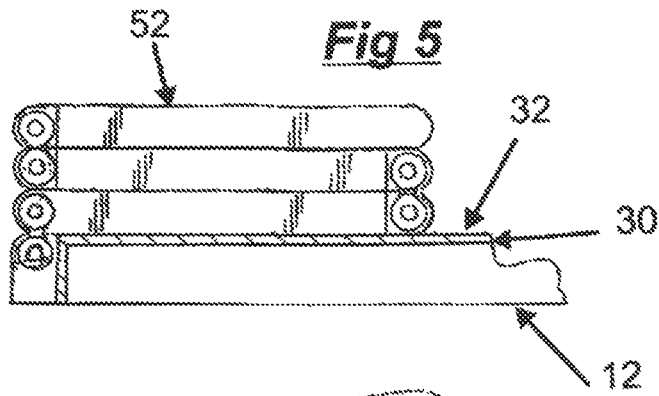
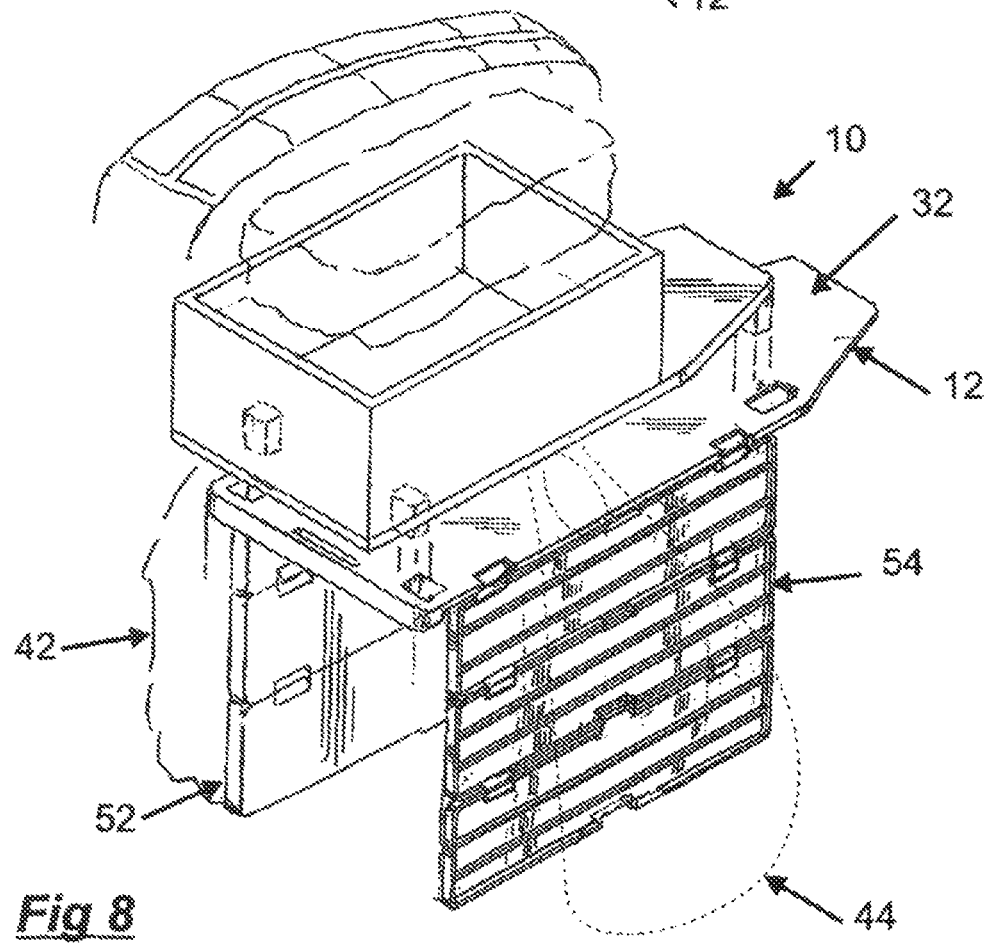

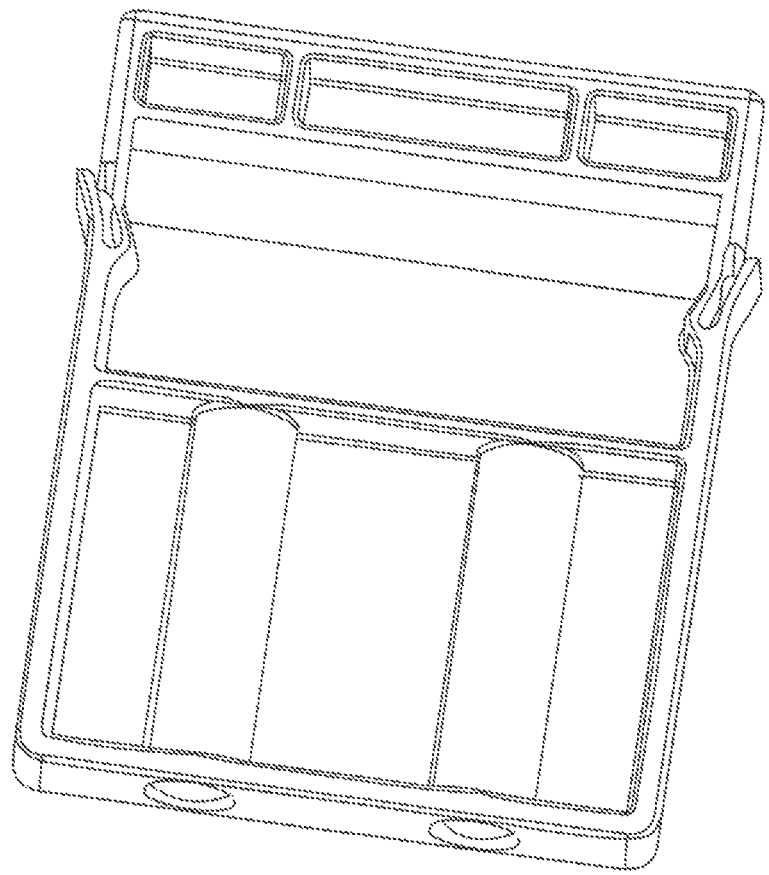
FIG. 21

REAR MOUNTED BIKE RACK

CROSS REFERENCE TO RELATED APPLICATIONS

This application is a continuation in part application of U.S. patent application Ser. No. 13/907,678 filed May 31, 2013, now abandoned which is a continuation application of U.S. patent application Ser. No. 12/592,956 filed Dec. 7, 2009, now U.S. Pat. No. 8,453,895, both of which are incorporated herein by reference in their entirety.

BACKGROUND OF THE INVENTION

In the United States bicycles have always been used for transportation by a fraction of the population. Their use is increasing in some locations as a convenient means of transportation. Bicycles are used for many local activities such as going to the store for shopping.

Many devices are known for attachment to the bicycle for transportation of cargo. There are child seats, usually mounted over the rear wheel, for accommodating an infant or small child as a passenger. Saddle bags can be attached over the rear fender. Saddle bags have also been positioned on both sides of the front wheel. They are mostly used by bicycling tourists. Hard-shell storage compartments can be mounted over and/or on the sides of the bicycle at the rear wheel. A basket can be attached to the handlebars. These are all useful for various purposes.

The devices for permitting the transportation of cargo on a bicycle are not well-suited to carry the results of grocery shopping. Modern-day grocery stores bag groceries in sheet polymer or canvas or other type of material bags which have handles formed by punching out a hand-hold near the open top of the bag. The load in the bag can be of various different shapes, depending upon the grocery product. If one bag is not strong enough to be carried by the handle, the goods are usually double-bagged to secure the bagged grocery products. These grocery bags carry the grocery products sold by the store. There is need for a rear-mounted bicycle rack for carrying grocery bags and similar items.

SUMMARY OF THE INVENTION

In order to aid in the understanding of this invention, it can be stated in essentially summary form that it is directed to a rear-mounted rack for mounting on a bicycle for supporting grocery bags and similar items. The bicycle rack has arms and clamps by which it is mounted on the bicycle. It has a platform on which is mounted a generally-upright post upon which the handles of grocery bags can be engaged. The platform has skirts on the side, which depend from the post and platform, which hold the grocery bags away from the rear wheel. When not carrying bags, the skirts can be folded up to be out of the way. By means of this structure, a plurality of grocery bags or the like can be carried on the rear of the bicycle.

It is thus an aspect of this invention to provide a rack, which can be mounted over the rear wheel of the bicycle which is configured for supporting grocery bags and similar items.

It is a further aspect of this invention to provide a rear-mounted bike rack which has a generally-upright post upon which the handles of grocery bags can be engaged.

It is another aspect of this invention to provide a rear-mounted bike rack which has a skirt on each side to hold grocery bags supported thereon away from the rear wheel of the bicycle.

It is a further aspect of this invention to configure the rack so that, when carrying bags, the skirts protect the bags from engagement on the rear wheel and, when not carrying bags, the skirts can be folded up to be out of the way.

It is a further aspect of this invention to provide a carrier box which can be removably attached to the rack platform with the carrier box configured to engage on the platform both when the skirts are folded and when the skirts are deployed.

It is another aspect of this invention to provide a rear-mounted bike rack which is configured for supporting grocery bags and similar items, which can be economically provided so as to enhance the convenience of using a bicycle for grocery shopping.

The features of this invention may be best understood by reference to the following description, taken in conjunction with the accompanying drawings.

BRIEF DESCRIPTION OF THE DRAWINGS

FIG. 1 is a side elevational view of a bicycle, with parts broken away, with a rear-mounted bike rack for supporting grocery bags and similar items mounted thereon.

FIG. 2 is an enlarged rear elevational view, as seen generally along the line 2-2 of FIG. 1, with parts broken away. With the skirts folded into the stored position.

FIG. 3 is an enlarged section taken generally along line 3-3 of FIG. 1.

FIG. 4 is a perspective view of the bicycle rack with the skirts folded into the stored position and the supports broken away.

FIG. 5 is an enlarged section taken generally along the line 5-5 of FIG. 4, with parts broken away.

FIG. 6 is a view similar to FIG. 4, with the skirts in the deployed position.

FIG. 8 is a view similar to FIG. 6, on a somewhat reduced scale, showing the carrier box in exploded position, together with a load and netting in dashed lines.

FIG. 21 shows an underside view including a latch button; and

DETAILED DESCRIPTION OF THE INVENTION

Figure 7:
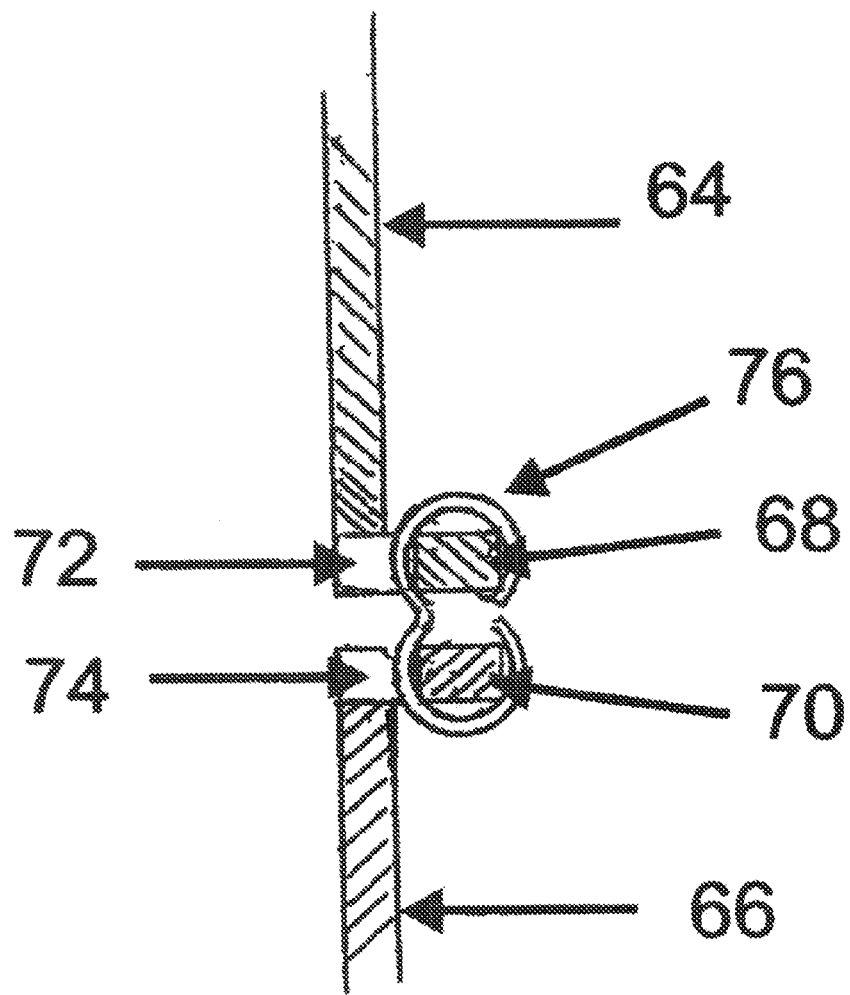
FIG. 7 is an enlarged section taken generally along line 7-7 of FIG. 6, with parts broken away.

The rear-mounted bike rack for supporting grocery bags and similar items of this invention is generally indicated at 10 in FIGS. 1, 4, 6 and 8. The bike rack has a platform 12 for mounting on the bicycle above its rear wheel in the usual way. The platform 12 has a tongue 14 on its front end. The tongue is engaged by two halves of a clamp 16 which embrace the bicycle seat post. At its rear, the bicycle rack is supported by means of left and right struts 18 and 20, which are seen in FIG. 2. At their lower end, the struts are mounted on or near the rear axle of the bicycle, as is seen in FIG. 1, and which is common for such struts. The two struts are strengthened by cross brace 22 which receives the upper end of the left and right struts. The cross brace is long enough in the direction of strut length as to provide significant structural rigidity. Left and right support legs 24 and 26 extend upward from the cross brace 22. These legs are pivotally engaged in the rear outer corners of the platform 12. Pin 28 engages through the rear flange of the platform and through the support leg 24, see FIG. 2. This provides for proper angular support.

The platform 12 has a top panel 30 which has the top surface 32. The top panel has flanges extending downward from the side edges. The left flange is seen in FIG. 2. The flanges extend all the way around the panel to provide strength to the top panel. The pin 28 is engaged through this flange. The platform 12 is thus supported with respect to the bicycle over the rear wheel thereof.

The purpose of the bicycle rack 10 is to permit the bicyclist to ride his bicycle to the grocery store and bring back groceries in bags. Grocery store bags are made, for example, of polymer film and are provided with handles. In order to permit the bags to be carried on the bicycle rack 10, T-bar 36 is provided, see FIGS. 3 and 6. T-bar 36 has a shank 38 and a cross bar 40. It is mounted on the bicycle rack to extend upward therefrom to be engaged by the handles of polymer grocery bags 42 and 44 are shown in dashed lines in FIG. 3. It is not necessary that the T-bar be extended to the upper position at all times. When groceries are not being carried, it can be folded down to a recess 46 in the lateral center of the platform 12, see FIG. 6. FIG. 3 shows pocket 48 in which the shank 38 is mounted, and pivot pin 50 which is engaged through the pocket and the shank 38. The T-bar 36 is shown in its raised position in FIGS. 3 and 6. When in its lowered position, it completely lies in the recess 46.

Another necessity when carrying grocery bags on a bicycle is to keep them out of engagement with the rear wheel. To accomplish this, left and right skirts 52 and 54 are provided. In FIGS. 2 and 4, the skirts are shown in their folded, storage position and, in FIGS. 6 and 8, they are shown in their unfolded, deployed position. Each of the skirts is formed of three identical panels. The panels in the left and right skirt are identical also. The left skirt is formed of panels 56, 58 and 60, which are shown in their folded position in FIG. 5 and in their deployed position in FIG. 6. The right skirt 54 is formed of panels 62, 64 and 66. Each of the panels has a flat surface and has flanges extending downward from the surface around the edges thereof to enhance strength. Additionally, as seen in FIG. 6, each panel has two longitudinal intermediate flanges extending downward to increase strength.

Hinging the panels together is accomplished by hinges which are illustrated in FIG. 7. The down-turned edge flanges 68 and 70 are shown in FIG. 7. At the hinges, slots 72 and 74 are formed so that the portions of the edge flange are left as hinge pins over a short portion of the flange. Hinge 76, preferably made of metal, is formed in a figure-eight shape so that it can be closed into the figure-eight shape after it is installed, as shown. This hinge permits the panels to move between the stored position and the deployed position because of the freedom of the hinges to permit swinging in either direction. For example, the swinging hinges permit this freedom as the panel 62 is folded in the counterclockwise direction with respect to panel 64. With these hinges, the panels can be folded back and forth between the deployed and the stored positions.

When in the stored position shown in FIG. 4, the edge notches 78 and the edge flange of each of the panels line up to form a pocket 80, see FIG. 4, which is sized to permit the T-bar to stand out if desired. Normally when the panels are in their stored position, shown in FIG. 4, the T-bar is in the down position. When the panels are in the deployed position and the T-bar 36 is up, the bags 42 and 44 can be engaged over the T-bar for carrying on the bicycle rack.

As an additional utility for the bicycle rack, carrier 82 is also provided, see FIG. 8. Carrier 82 has a bottom floor 84 on which are mounted walls to define an open-top box. Left and right walls 86 and 88 and front and back walls 90 and 92 define the open top box portion of the carrier. Platform 12 has sockets 94, 96, 98 and 100, see FIG. 6. The bottom of bottom floor 84 has corresponding legs. Legs 102 and 104 are shown in dashed lines in FIG. 8. They are sized to fit into sockets 94 and 96. Leg 106 is also seen in FIG. 8, and it is sized and configured to fit into socket 100. A corresponding leg fits into the socket 98.

In FIG. 8, the carrier 82 is shown in projected position with respect to the top surface 32 of the platform. When the side panels are deployed, as shown in FIGS. 6 and 8, the carrier fits directly onto the platform. When the side panels are in their stored condition, shown in FIG. 4, it is seen that the sockets are exposed. The legs are sufficiently long so that the carrier can be placed over the stored panels and the legs engage into the sockets. In this way, the carrier can be carried on the platform with the panels in their stored position. FIG. 8 shows a package 108 in dashed lines which can be held in place by means of a netting 110. The netting is elastic or has elastic connections. The netting has connections configured to engage under the flanges on the edges of the platform to resiliently hold the netting, package and carrier in place. If desired, the netting can be used without the carrier 82, but simply engage over the folded panels to hold the skirts in place in their folded position. In this way, great versatility is achieved.

Figure 9:
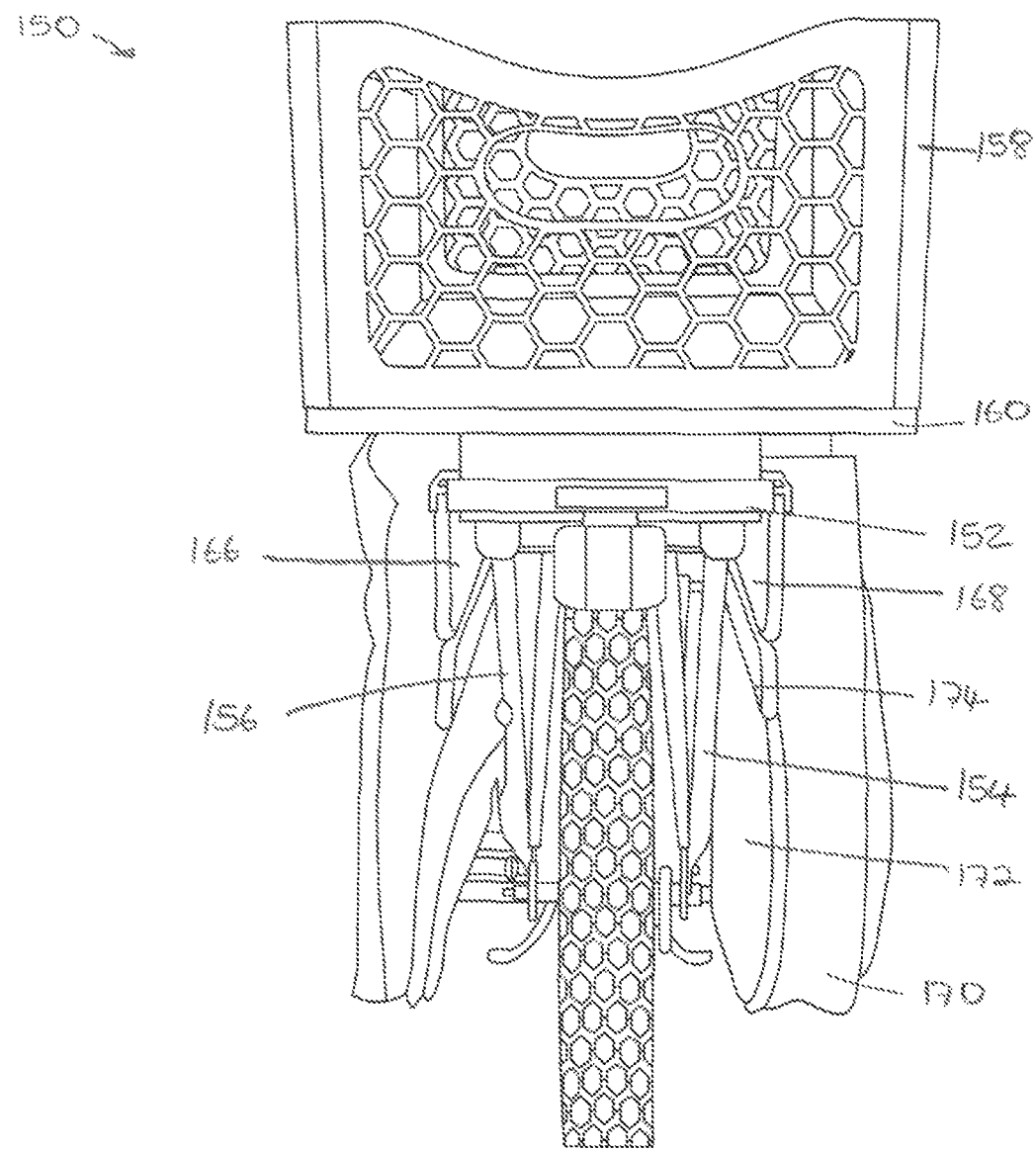
FIG. 9 is a rear view of a rack and box mounted on a bicycle in accordance with a further embodiment of the invention.

With reference to FIG. 9 of the drawings, there is shown a further embodiment of a rear mounted bicycle rack 150. The bicycle rack 150 includes a rack base 152 mounted on supports 154 and 156, attached to the wheel of a bicycle. A basket 158 having a base 160 is shown mounted on the rack base 152. Left and right side panels 166 and 168 form lateral skirts, as described above. A bag 170 is mounted over the rack base 152, and depends downwardly therefrom on each side of the bicycle, adjacent the skirts defined by the side panels. The bag 170 includes a pocket 172 having an open upper end 174, and the lateral skirts defined by the panels can be fitted in the pockets 172 to further stabilize the bag 170 with respect to the bicycle rack 150.

The bag 170 provides additional storage space. Its pockets allow it to be attached in a releasable manner to the skirts formed by the panels, so that the bag is held in a more stable condition.

Figure 10:
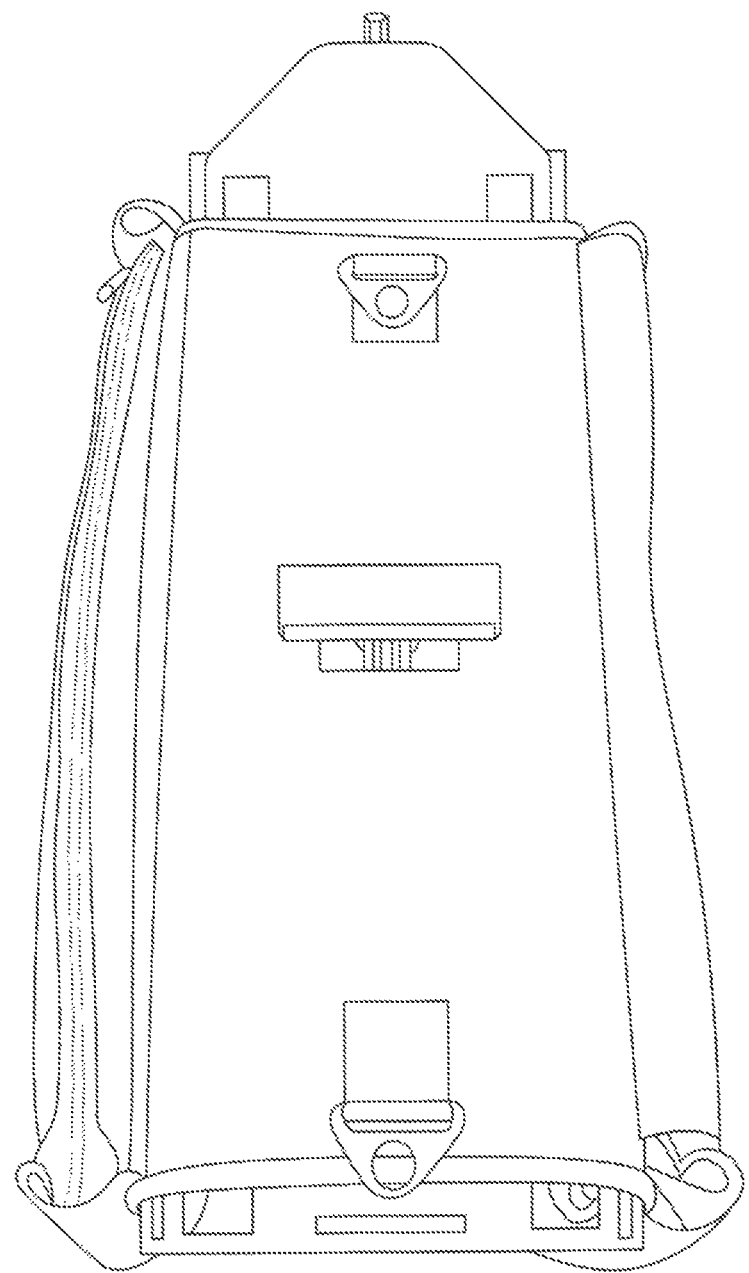
FIG. 10 is a top view of rack in accordance with the invention.
Figure 11:
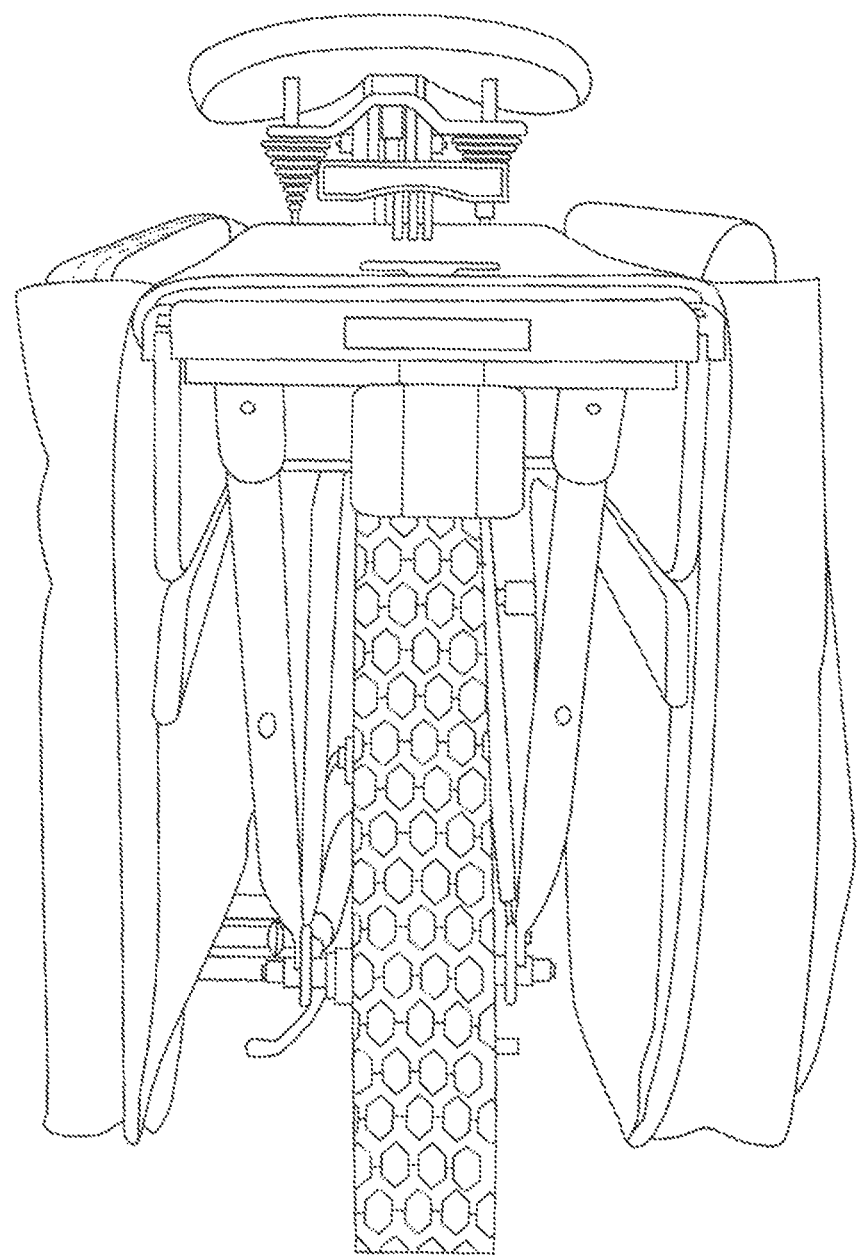
FIG. 11 is a rear view of a bicycle with a rack and bag mounted thereon.

FIG. 10 of the drawings shows the top of the bicycle rack with the bag on each side, and suspended over the upper surface. FIG. 11 of the drawings shows a rear view of a bicycle with the bicycle rack mounted over the rear wheel, and the bags mounted over the rack. The basket or box shown in a previous figure has been removed. FIG. 11 shows the side panels inserted in the pocket of the bag.

Figure 12:
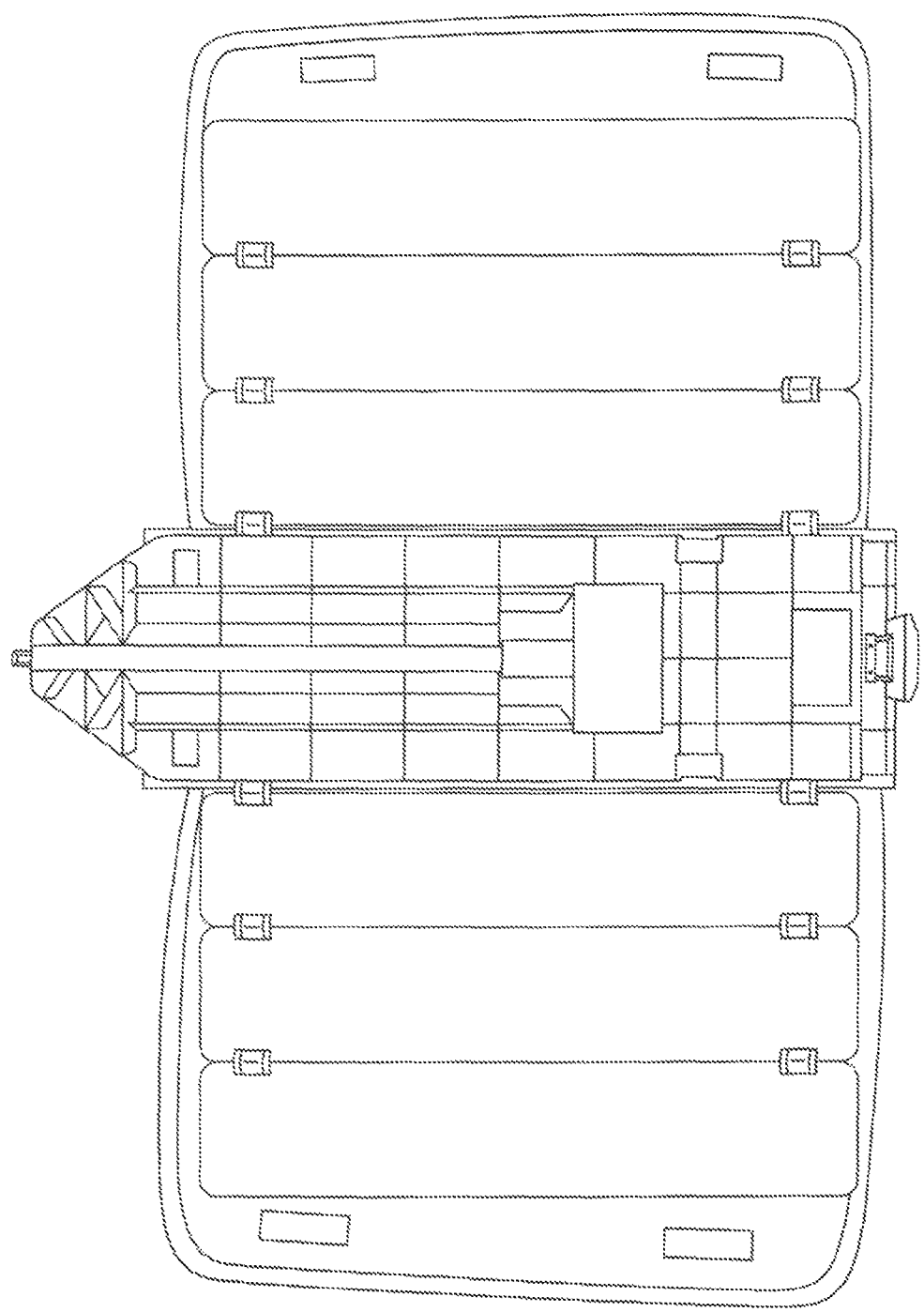
FIG. 12 is a bottom view of a rack with lateral skirts and a bag thereover.
Figure 13:
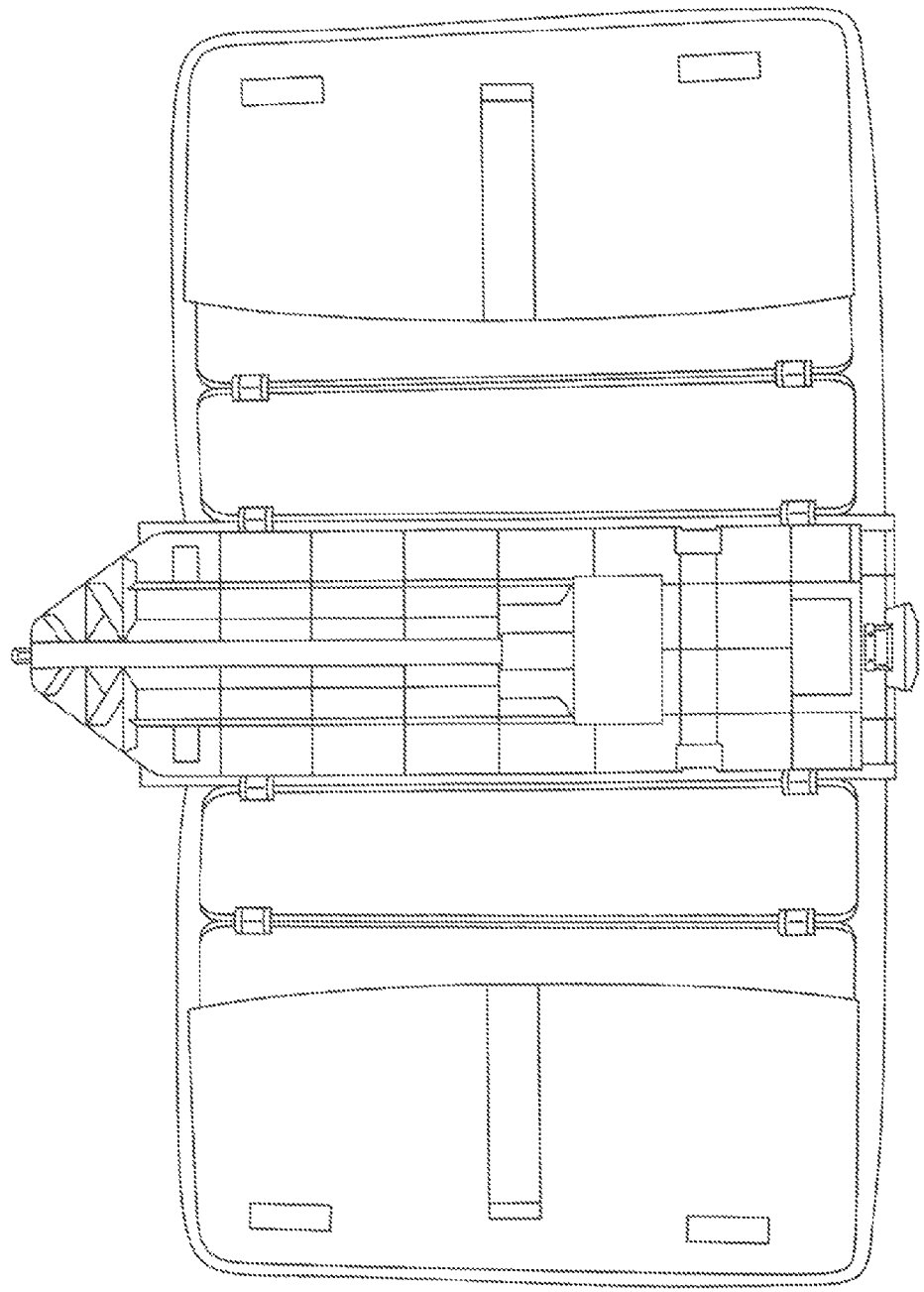
FIG. 13 is a bottom view similar to that shown in FIG. 12 of the drawings, but with at least some of the panels forming the skirt inserted in a pocket of the bag.
Figure 14:
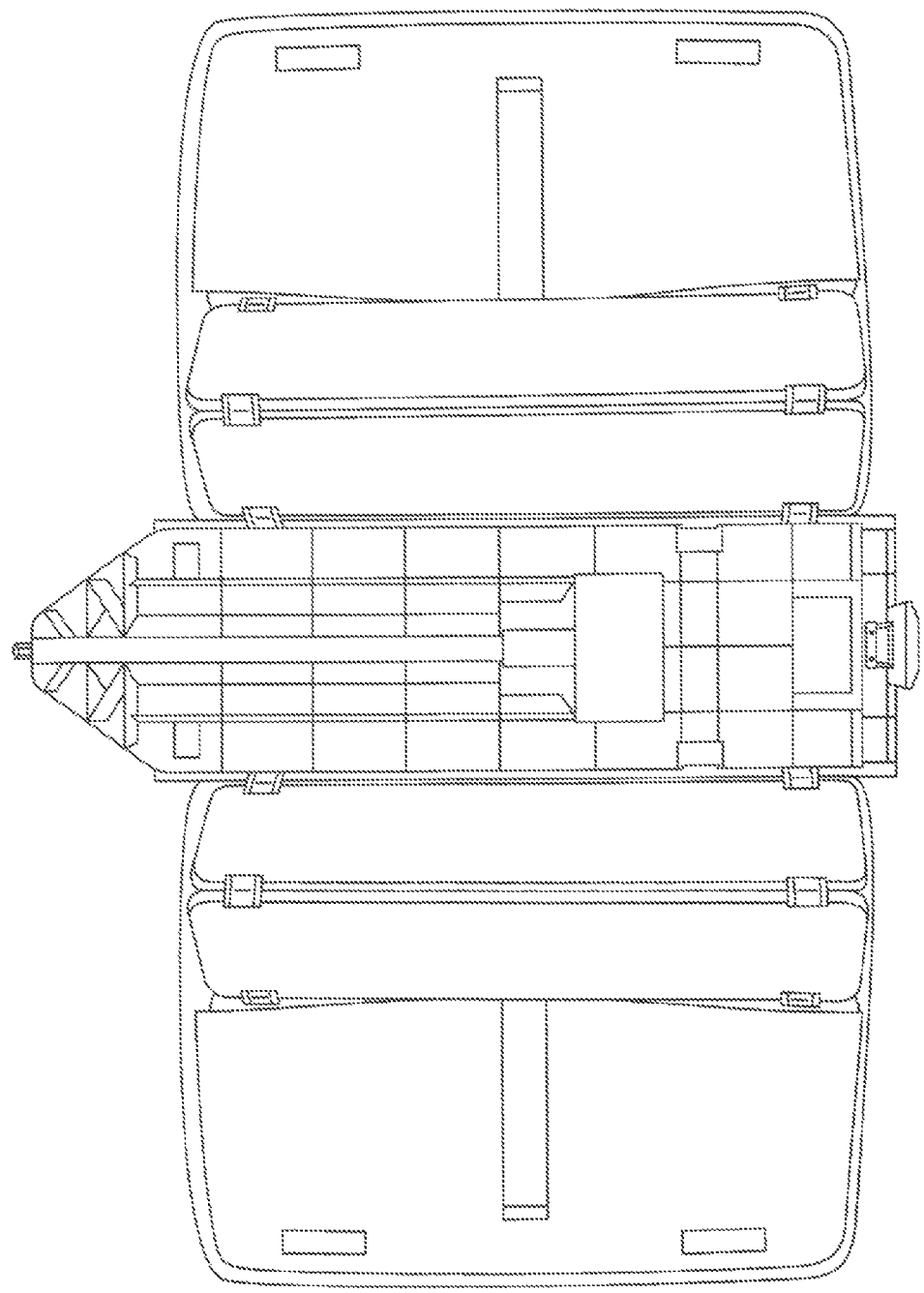
FIG. 14 is a bottom view similar to that shown in FIG. 13 but with the panels of the skirt slightly angled.

FIG. 12 of the drawings shows an under view of the central bicycle rack portion, and the side skirts each comprised of three hinged panels. The rack and side panels are mounted over a bag, which can be seen beneath the skirts. FIG. 13 of the drawings shows a view similar to that in FIG. 12, but wherein at least some of the side panels have been inserted into a pocket formed on the inside of the bag, on the surface adjacent the bicycle wheel. FIG. 14 shows a similar view to that shown in FIG. 13, but with the panels angled upward, illustrating how the panels are able to work and adapt with the bag design.

Figure 15:
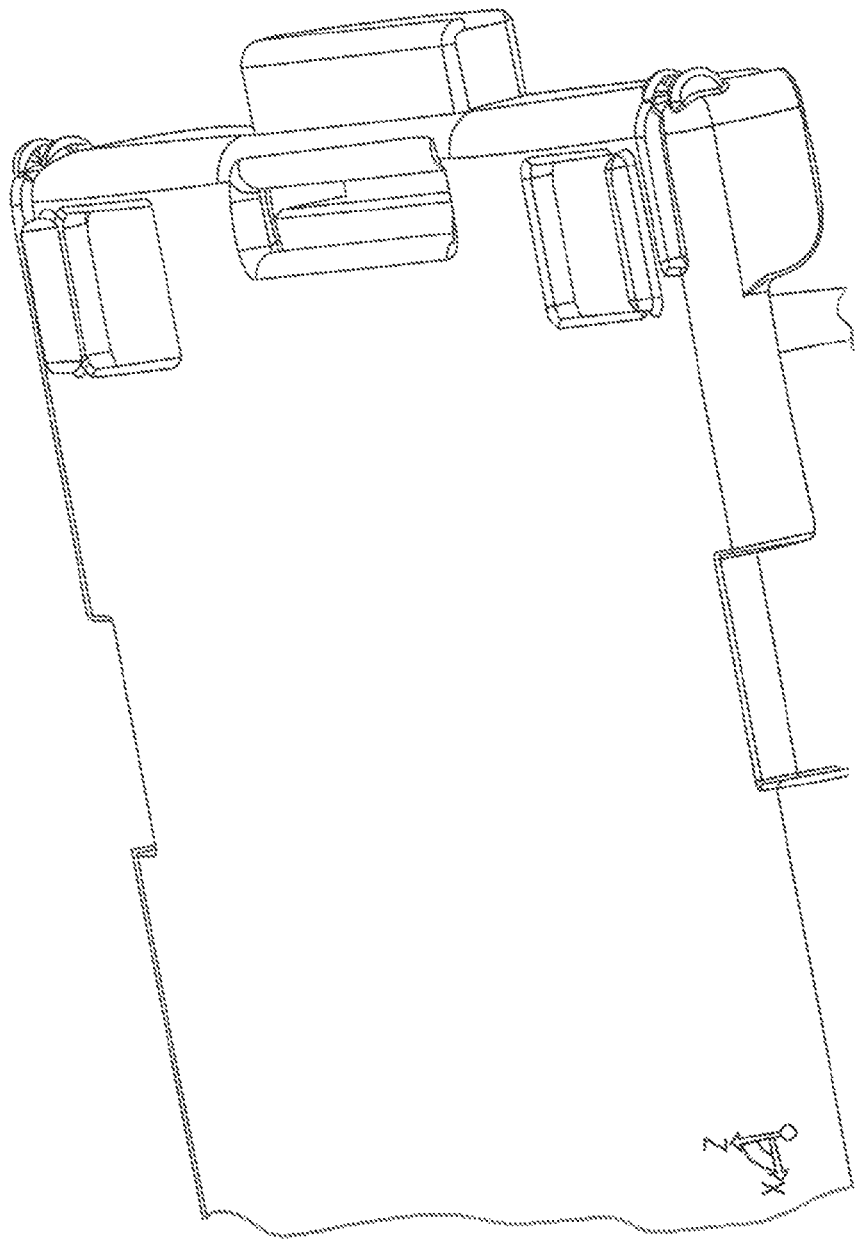
FIG. 15 is a perspective view of the back of the rack fitting portion for the legs and latch button.
Figure 16:
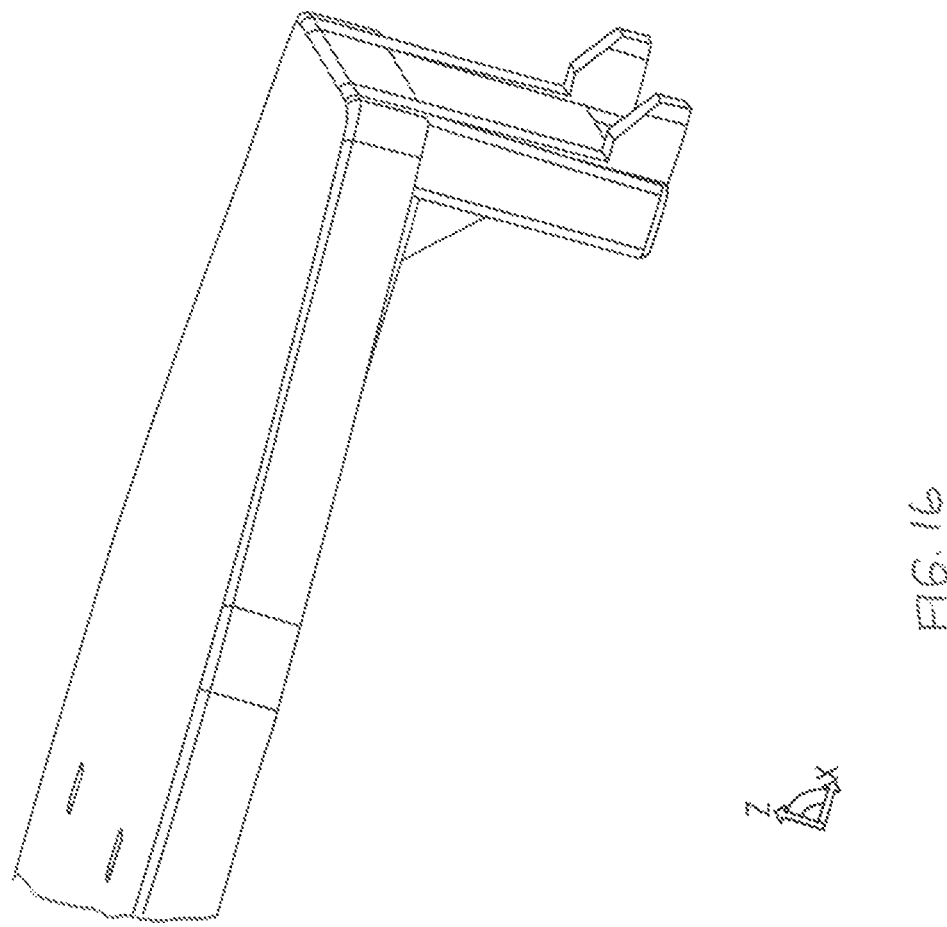
FIG. 16 is a perspective view showing the front legs of the box base.
Figure 17:
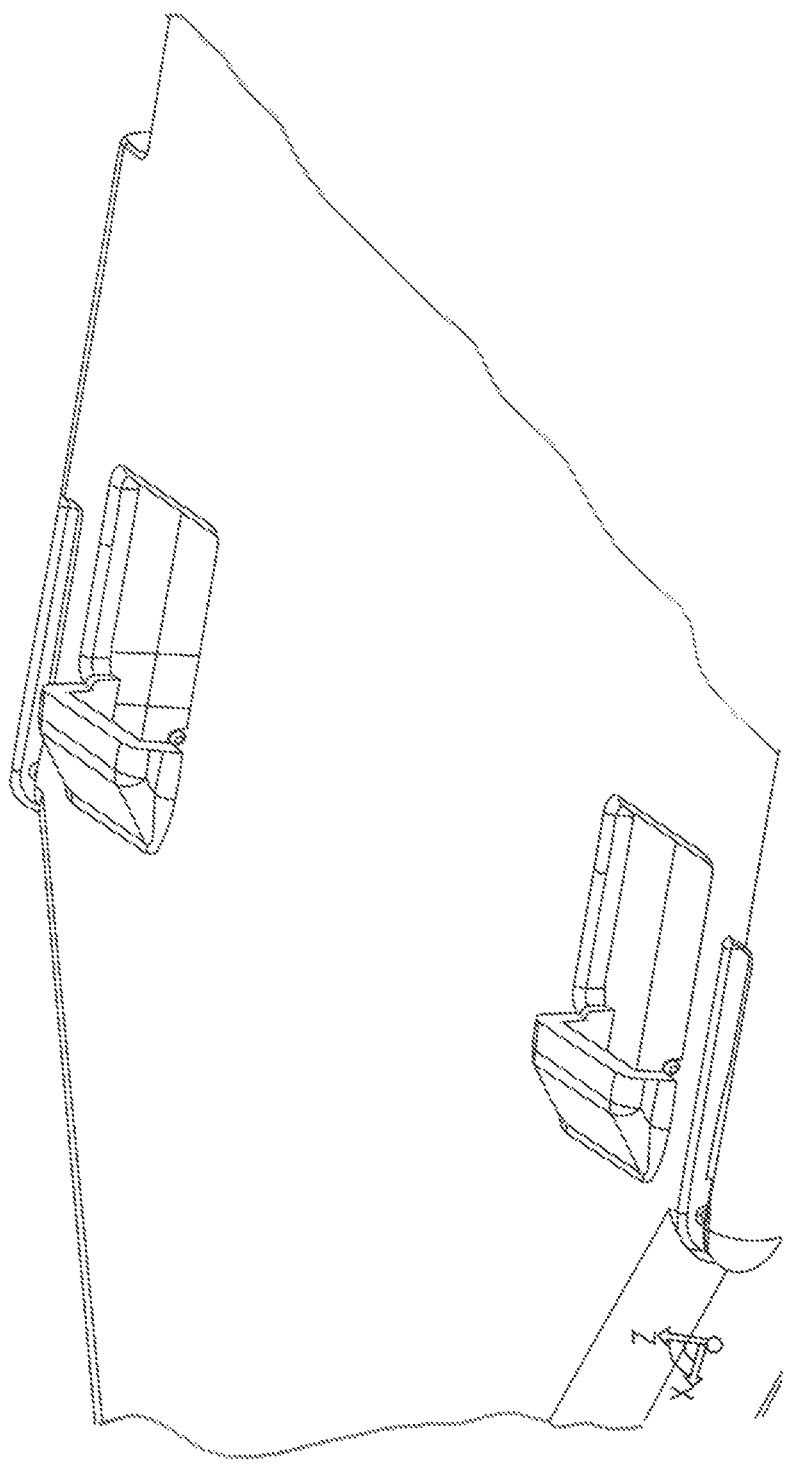
FIG. 17 is a detailed view showing the front rack fittings for the legs.
Figure 18:
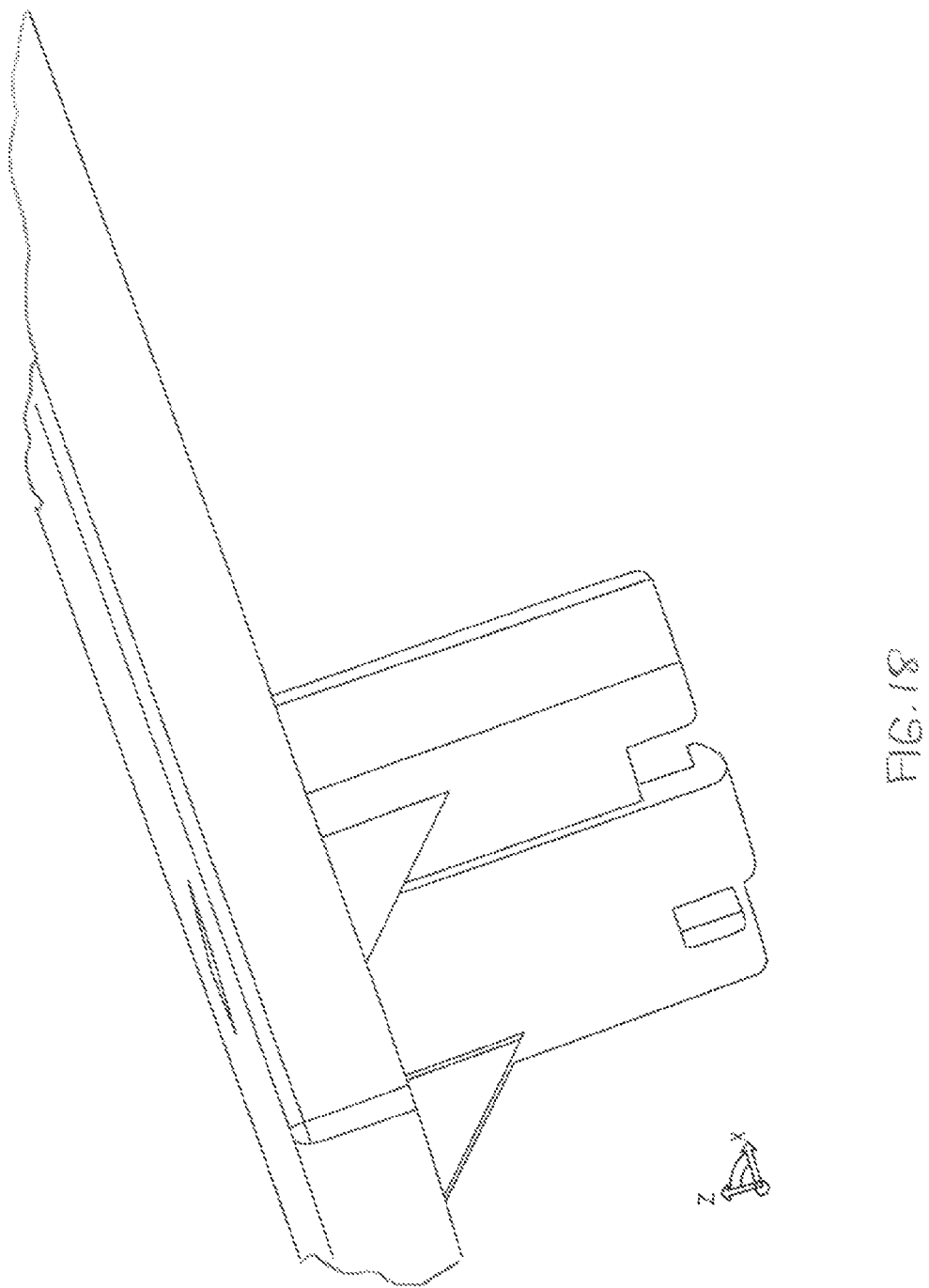
FIG. 18 is a detailed perspective view of the rear legs and hook assembly.

FIG. 15 shows a detail of the back of the bicycle rack, including the fittings for the leg, as well as the latch button for the release thereof. The front legs of the box base are illustrated in FIG. 16 of the drawings, including projections which engage in corresponding apertures. FIG. 17 shows the front of the rack with appropriate fittings or receivers for the legs, to releasably hold them, and any box or other device to which they are attached, stable and secure relative to the rack. FIG. 18 shows the detail of the rear legs and the hook assembly.

Figure 19:
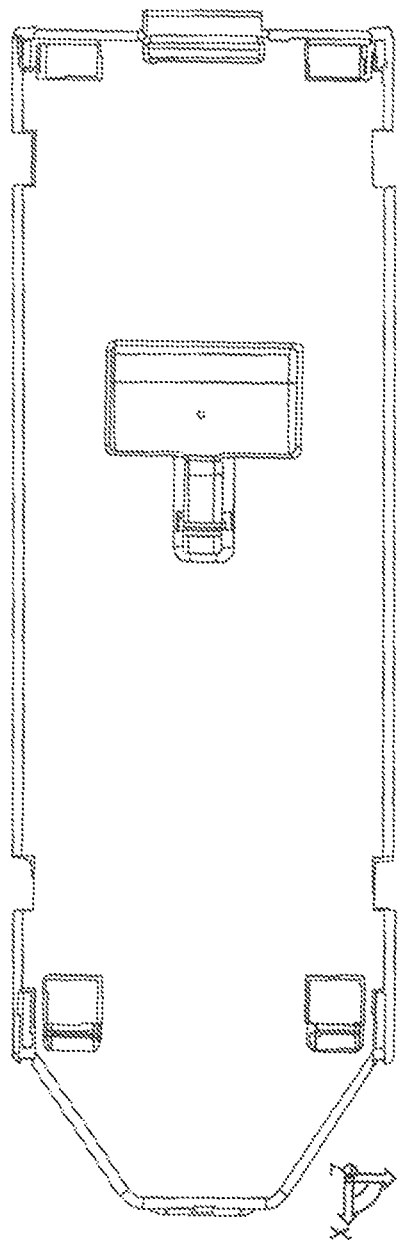
FIG. 19 is a top view of the rack base in accordance with an embodiment of the invention.

FIG. 19 of the drawings shows a top view of the rack base with the various apertures for the legs, as well as the central portion where the pivotable bar is accommodated, the pivotable bar preferably being extendable between a position in which it extends above the surface of the rack base, and a position in which it is below or substantially below the surface thereof. In this way, the pivotable bar can be extended when needed, and stored out of the way when not needed.

Figure 20:
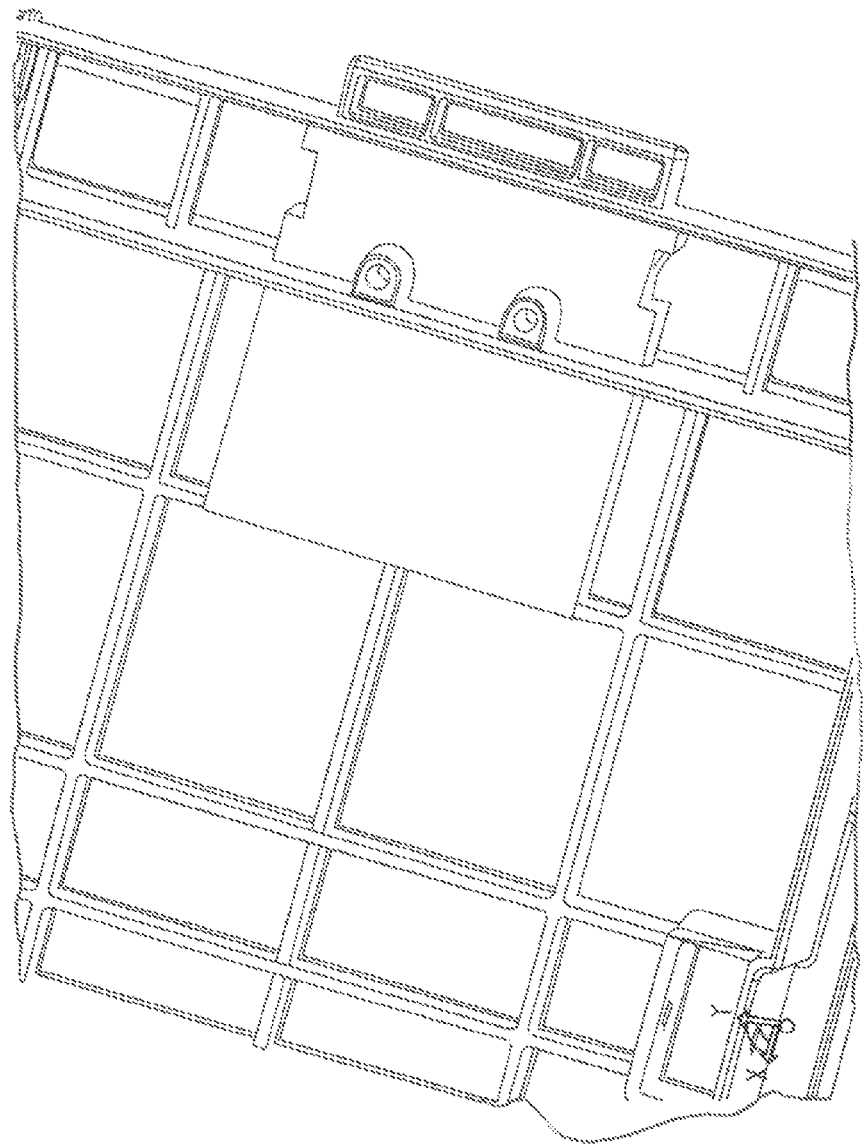
FIG. 20 shows the underside of the rear of the rack with the latch button.
Figure 22:
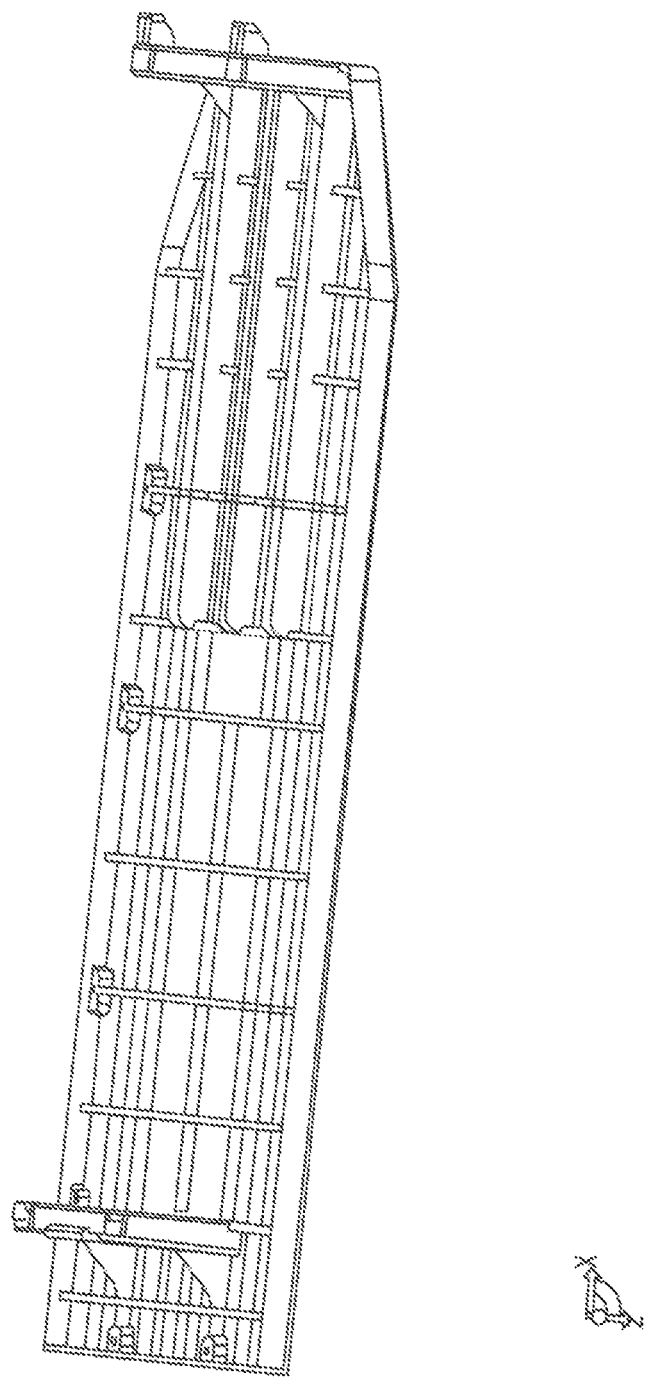
FIG. 22 is an underside view of the box base.

FIG. 20 shows an under side view of the back of the rack, and the latch button. FIG. 21 also shows an underside view, with further details of the latch button assembly. FIG. 22 of the drawings shows an underside view of the box base, showing several of the features and the legs therefor.

With respect to the latch button, the drawings illustrate two selectively sized springs that may be loaded into two holes, seen in FIG. 21 of the drawings. The latch assembly is then inserted into the cavity on the rack base. Once the latch is pushed all the way in, two wing like structures on each side engage two slots built into the latch cavity to hold the button in place.

In this way, the user will hold the box at a slight angle, with the front end down to engage the front two legs with the front two sockets or fittings. Thereafter, the rear of the box is lowered to align the rear legs on the box base with the rear sockets or fittings on the rack base. At this point, the spring-loaded latch button which moves a slot built into the latch in line with the hook assembly is pushed, and when the button is released, the slot moves back and locks with a hook assembly on the box base. Removal of the box can be effected by performing the above steps in reverse.

This invention has been described in its presently contemplated best modes and it is clear that it is susceptible to numerous modifications, modes and embodiments within the ability of those skilled in the art and without the exercise of the inventive faculty. Accordingly, the scope of this invention is defined by the scope of the following claims.

The invention claimed is:

1. A rack for mounting on a bicycle, comprising: a platform, said platform having a top surface, structure for removably mounting said platform with respect to the frame of a bicycle; a post mounted on said platform so that it can extend above said top surface of said platform; left and right skirts mounted on said platform, said skirts being positionable in a deployed position to inhibit grocery bags engaged on said post from engaging the rear wheel of the bicycle, said skirts being mounted on said platform so that they can be carried on said platform in a stored position; and a storage bag positioned over the platform and skirts, the storage bag having inside facing pockets for accommodating at least a part of the skirts.

2. The bicycle rack of claim 1 wherein there is pivot structure on said platform, said left and right skirts being mounted on said pivot structure so that said skirts can move from a deployed position when they extend downward from said platform to a storage position where they can be stored on said top surface of said platform.

3. The bicycle rack of claim 2 wherein said pivot structure comprises slots formed in the edges of said platform and said skirts to define pivot pins and a hinge structure engaging said pivot pins.

4. The bicycle rack of claim 3 wherein said hinge structure comprises a figure eight structure engaging both of said pivot pins.

5. The bicycle rack of claim 1 wherein each of said left and right skirts is formed of at least first and second panels, said first panel being hinged to said platform and said second panel being hinged to said first panel.

6. The bicycle rack of claim 5 wherein said platform and said panels each have edge flanges and each have a slot formed adjacent said flange to define hinge pins and there is hinge structure engaging said pins to permit hinging of second panel on said first panel and said first panel upon said platform.

7. The bicycle rack of claim 6 wherein said hinged structure comprises a figure eight structure engaging pairs of said hinge pins.

8. A bicycle rack comprising: a platform for mounting over the rear wheel of a bicycle, said platform having left and right edges; left and right skirts being respectively pivoted on the left and right edges of said platform, said left and right skirts having a deployed position wherein they depend downward from said platform and a storage position where they lie on the top of said platform; and attachment structure on said platform so that grocery bags can be engaged on said attachment structure and said grocery bags are protected against engagement with the rear wheel of the bicycle by means of said left and right skirts when they are in a deployed position; and a storage bag having a central portion and two lateral portions for placing over the platform and skirts respectively, the storage bag having a pocket formed thereon for accommodating in a releasable manner at least a part of each of the skirts.

9. The bicycle rack of claim 8 wherein said first and second skirts are each pivotally mounted on said platform so that they can be pivoted from a depending, deployed position to a stored position wherein they lie on said platform.

10. The bicycle rack of claim 9 wherein said left and right skirts each is comprised of at least first and second skirt panels, said first and second skirt panels being hinged with respect to each other and said first skirt panel being hinged with respect to said platform.

11. The bicycle rack of claim 10 wherein said hinges between said first and second panels comprise hinge pins formed on said panels and hinged structure engaging said hinge pins.

12. The bicycle rack of claim 8 further including a carrier which can be demountably positioned on said platform, said platform and said carrier having sockets and legs so that when said sockets and legs are interengaged, said carrier is removably mounted on said platform.

13. The bicycle rack of claim 12 wherein said sockets and legs are configured so that they can interengage when said skirts are in folded position, on top of said platform.

14. The bicycle rack of claim 8 wherein said left and right skirts are each comprised of first and second panels, said first panel being hinged with respect to said platform and said second panel being hinged with respect to said first panel so that said panels can be moved with respect to each other and with respect to said platform to lie on top of said platform in stacked position.

15. The bicycle rack of claim 14 wherein said hinges are formed by slots at the edges of said platform and said panels so that said slots define hinge pins and there is a hinge member interengaging said hinge pins to permit hinging between said panels.

16. The bicycle rack of claim 15 further including a carrier, said carrier and said platform having demountable mounting structure thereon, said demountable mounting structure being figured so that said carrier can be mounted on said platform when said skirts are in their deployed position and when they are in their stored position.

17. The bicycle rack of claim 16 wherein said carrier structure is a boxlike structure.

18. The bicycle rack of claim 8 further including an upright post on said platform which extends above said platform so that grocery bags can be engaged thereon for carrying on said bicycle rack.

19. The bicycle rack of claim 18 wherein said upright post is pivoted on said platform so that it can be moved from a raised position in which it extends above said platform to a stored position wherein it lies below the top of said platform.

* * * * *